(12) United States Patent
Mo et al.

(10) Patent No.: US 9,596,136 B2
(45) Date of Patent: Mar. 14, 2017

(54) SOFTWARE MIGRATION METHOD AND APPARATUS IN MICRO-SERVER ENVIRONMENT

(71) Applicant: Samsung Electronics Co., Ltd., Suwon-si, Gyeonggi-do (KR)

(72) Inventors: Sangdok Mo, Hwaseong-si (KR); Sungmin Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 412 days.

(21) Appl. No.: 14/157,948

(22) Filed: Jan. 17, 2014

(65) Prior Publication Data
US 2014/0215060 A1  Jul. 31, 2014

(30) Foreign Application Priority Data
Jan. 29, 2013 (KR) .................. 10-2013-0009797

(51) Int. Cl.
*G06F 15/173* (2006.01)
*H04L 12/24* (2006.01)
(Continued)

(52) U.S. Cl.
CPC .............. *H04L 41/082* (2013.01); *G06F 8/76* (2013.01); *G06F 9/00* (2013.01); *G06F 9/22* (2013.01);
(Continued)

(58) Field of Classification Search
CPC .... G06F 11/1402; G06F 11/1433; G06F 9/22; G06F 9/30; G06F 9/44; G06F 9/455;
(Continued)

(56) References Cited

U.S. PATENT DOCUMENTS

2007/0204265 A1   8/2007  Oshins
2007/0294692 A1  12/2007  Zhao et al.
(Continued)

FOREIGN PATENT DOCUMENTS

EP    1901145 A2    3/2008

OTHER PUBLICATIONS

Yerosheva et al., "A Microserver View of HTMT", Proceedings 15th International Parallel and Distributed Processing Symposium, 2001, Notre Dame, IN.
(Continued)

*Primary Examiner* — Chirag R Patel
*Assistant Examiner* — Rachael J Hackenberg
(74) *Attorney, Agent, or Firm* — Jefferson IP Law, LLP

(57) ABSTRACT

A software migration method and an apparatus for migration of software running at a source node to a destination node with a migration scheme selected optimally in consideration of micro-server communication environment are provided. The software migration apparatus includes an environment monitor which monitors communication environment between a source node and a destination node constituting a micro-server and a migration policy manager which analyzes communication environment information acquired from the environment monitor and determines a migration scheme for migrating a software running at the source node to the destination node based on the analysis result.

28 Claims, 8 Drawing Sheets

(51) Int. Cl.
*G06F 11/14* (2006.01)
*G06F 9/22* (2006.01)
*G06F 9/00* (2006.01)
*G06F 9/30* (2006.01)
*G06F 9/44* (2006.01)
*G06F 9/455* (2006.01)
*H04L 12/26* (2006.01)

(52) U.S. Cl.
CPC .............. *G06F 9/30* (2013.01); *G06F 9/44* (2013.01); *G06F 9/455* (2013.01); *G06F 11/1402* (2013.01); *G06F 11/1433* (2013.01); *H04L 43/0894* (2013.01)

(58) Field of Classification Search
CPC ......... G06F 9/00; G06F 8/76; H04L 43/0894; H04L 41/082
See application file for complete search history.

(56) References Cited

U.S. PATENT DOCUMENTS

| | | |
|---|---|---|
| 2008/0184060 A1 | 7/2008 | Carlson et al. |
| 2010/0175063 A1* | 7/2010 | Ciano ................. G06F 9/4862 718/1 |
| 2010/0205599 A1 | 8/2010 | Vaidya et al. |
| 2012/0117417 A1* | 5/2012 | Graham ............. G06F 11/1484 714/4.12 |
| 2013/0007216 A1 | 1/2013 | Fries et al. |
| 2014/0146055 A1* | 5/2014 | Bala ................... G06F 11/1402 345/501 |

OTHER PUBLICATIONS

Chan et al., "Gaia Microserver: An Extendable Mobile Middleware Platform", Proceedings of the 3rd IEEE International Conference on Pervasive Computing and Communications, 2005, Urbana-Champaign, IL.

* cited by examiner

SOFTWARE MIGRATION METHOD AND APPARATUS IN MICRO-SERVER ENVIRONMENT

CROSS-REFERENCE TO RELATED APPLICATION(S)

This application claims the benefit under 35 U.S.C. §119(a) of a Korean patent application filed on Jan. 29, 2013 in the Korean Intellectual Property Office and assigned Serial number 10-2013-0009797, the entire disclosure of which is hereby incorporated by reference.

TECHNICAL FIELD

The present disclosure relates to a software migration in a micro-server environment. More particularly, the present disclosure relates to a method and apparatus for migrating software operating at a source node to a destination node with a migration scheme selected optimally in consideration of micro-server communication environment.

BACKGROUND

According to the related art, the software migration from one device to another aims to conserve energy in the x86 server environment.

According to the related art, the software migration is a process of moving the Operating System (OS) such as Linux and Window operating in the virtualization environment such as VMWare and XEN on the physical host to another virtualization environment such as VMWare and XEN on another physical host without service suspension.

In order to save power consumption of the data center, recent researches are focused on the low power micro-server with the requirement of a software migration technology capable of being used in the changed hardware and server environment.

In order to complement the load balancing, scheduled maintenance, and fault tolerance of the server environment, there is a need for an optimized migration technology based on the micro-server fulfilling restrictions and requirements different from those of the migration based on the conventional x86 server and network such as Ethernet.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a software migration method and apparatus in the micro-server environment that is capable of migrating the software running at the source node to a destination mode through a migration method optimally selected in consideration of the micro-server environment with least service suspension time, resulting in fast and efficient software migration.

In accordance with an aspect of the present disclosure, a software migration apparatus for use in a micro-server environment is provided. The software migration apparatus includes an environment monitor which monitors communication environment between a source node and a destination node constituting a micro-server and a migration policy manager which analyzes communication environment information acquired from the environment monitor and determines a migration scheme for migrating a software running at the source node to the destination node based on the analysis of the communication environment between the source node and the destination node.

In accordance with another aspect of the present disclosure, a software migration method for use in a micro-server environment is provided. The software migration method includes analyzing communication environment between a source node and a destination node constituting a micro-server and determining a migration scheme for migrating software running at the source node to the destination node based on the analysis of the communication environment between the source node and the destination node.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
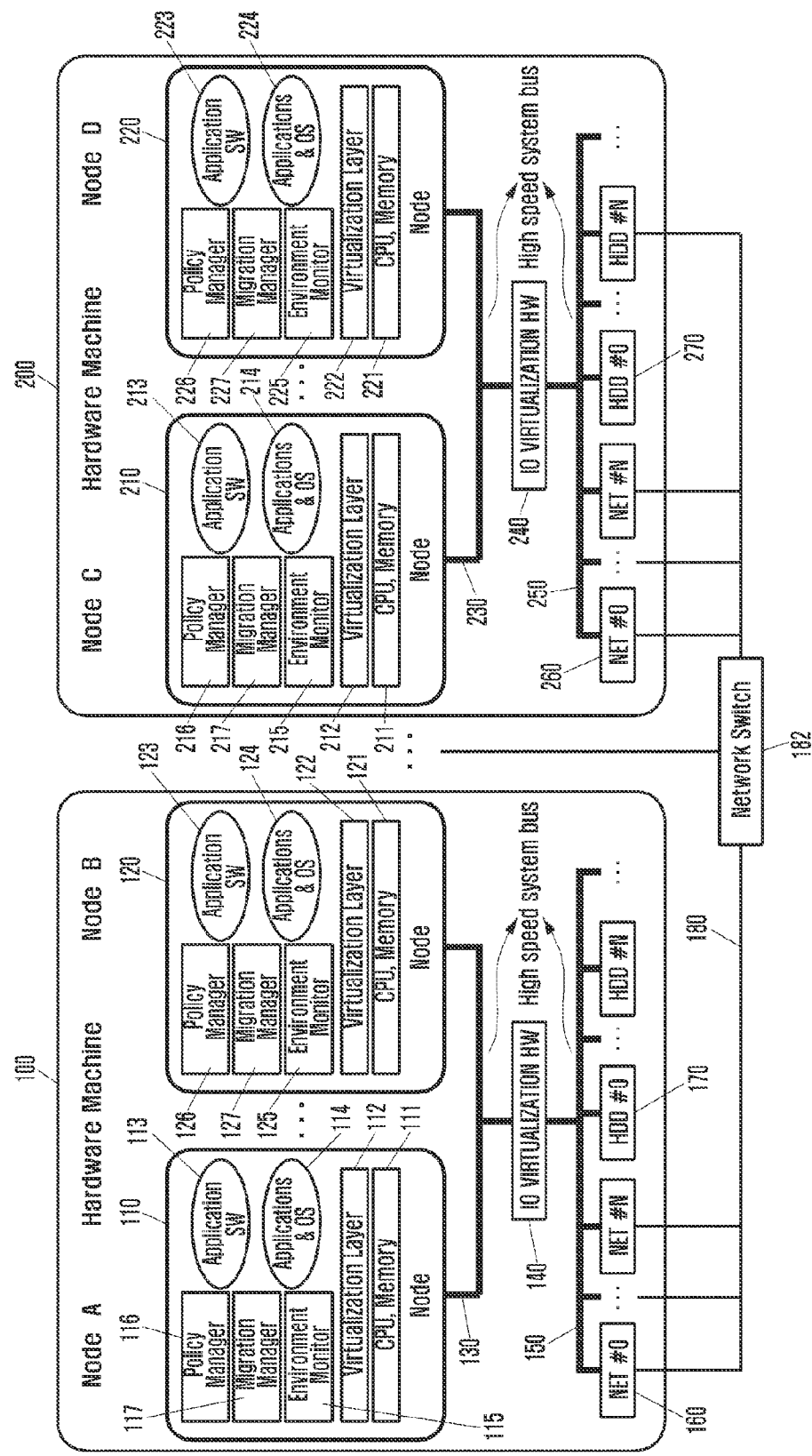
FIG. 1 is a schematic diagram illustrating a micro-server environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, certain elements may be exaggerated or omitted or schematically depicted for clarity of the disclosure, and the actual sizes of the elements are not reflected. Thus, the present disclosure is not limited in the relative sizes of the elements and distances therebetween.

FIG. 1 is a schematic diagram illustrating a micro-server environment according to an embodiment of the present disclosure.

Referring to FIG. 1, the micro server environment includes a first micro-server 100 and a second micro server 200 implemented on different hardware systems that are connected to each other through a network 180 and a network switch 182.

The first micro-server 100 includes a first node 110, a second node 120, system buses 130 and 150 connecting the first and second nodes 110 and 120, an Input/Output (IO) virtualization hardware 140, at least one network device 160, and at least one storage unit (e.g., hard disc drive 170).

Each of the first and second nodes 110 and 120 can be a computing board including at least one processor (e.g., a Central Processing Unit (CPU)) and a memory. Each of the first and second nodes 110 and 120 may include one or more processor and memory sets.

According to various embodiments of the present disclosure, a micro server may include at least one computing board in the form of an attachable card, and the configuration of the computing board is not limited.

The first node 110 and the second node 120 may share the resource such as network device 160 and the hard disc 170 included in the first micro server 100.

The first node 110 110 may include the processor and memory 111 and the virtualization layer 112. According to various embodiments of the present disclosure, the first node 110 may execute at least one software element 113 through the Operating System (OS) 114.

Particularly, the first node may determine whether to minimize the entire migration time or the service suspension time depending on the communication environment between the computing resource and the computing board of the micro-server. The first node 110 may include at least one migration platform 118 (see FIG. 2) executing and managing migration of at least one of software, application, and OS.

According to various embodiments of the present disclosure, in the micro-server environment, the OS (including applications) 114 is the main target of the software. Although the description is directed to the software migration for convenience purpose, the present disclosure is applicable for migration of at least one of OS and applications.

For example, the migration platform 118 may select an optimal migration scheme and execution of migration of the software 113 running on the first node to another node or the software running on another node to the first node according to the selected migration scheme.

Similar to the first node 110, the second node 120 may include a processor and memory 121 and virtualization layer 122. The second node 120 may execute at least one software element 123 through the OS 124. The second node 120 may include a migration platform 128 (e.g., including an environment monitor 125, a policy manager 126, and a migration manager 127) which determines whether to minimize the entire migration time or the service suspension time depending on the computing resource and the communication environment between the computing boards and which executes and manages the software migration.

Because the second micro-server 200 is identical with the first micro-server 100 in configuration, detailed description thereon is omitted herein.

Figure 2:
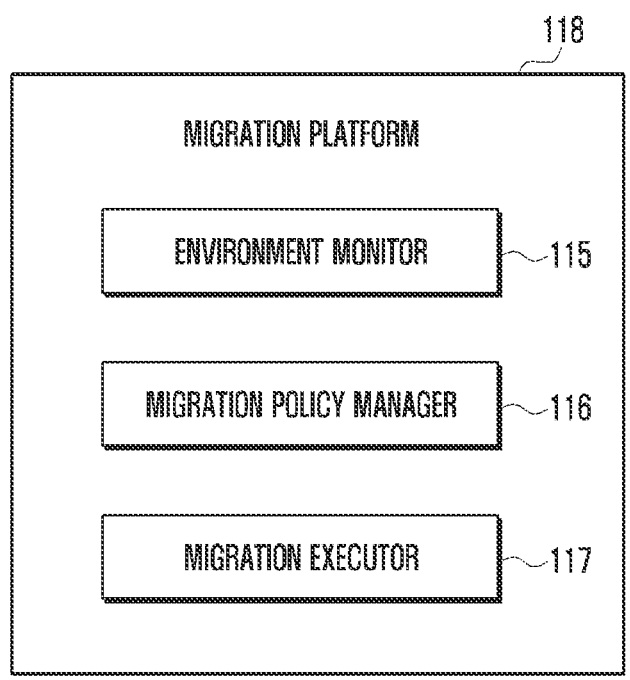
FIG. 2 is a block diagram illustrating a configuration of a migration platform of a micro-server according to an embodiment of the present disclosure.

FIG. 2 is a block diagram illustrating a configuration of a migration platform of a micro-server according to an embodiment of the present disclosure.

Referring to FIG. 2, according to various embodiments of the present disclosure, the migration platform 118 of the micro-server includes an environment monitor 115, a migration policy manager 116, and a migration executor 117.

The migration platform 118 is responsible for migrating the software running on one node to another node without stopping operation of the software, thereby migrating the software without service suspension to the user.

The migration platform 118 can be implemented in the nodes 110, 120, 210, and 220 individually or separately outside of the nodes 110 and 120 constituting the micro-server 100 so as to be shared by the node 110 and 120. However, various embodiments of the present disclosure are not limited to such configuration relationships of the migration platform and nodes.

The environment monitor 115 is a component for monitoring the computing board resource and the communication environment between the computing boards of the micro-server. For example, the environment monitor may monitor the communication environment among the nodes 110, 120, 210, and 220. The environment monitor 115 may check (e.g., determine) the connection between the source and destination nodes and communication means, and may analyze the data rate between the source and destination nodes.

The migration policy manager 116 checks (e.g., determines) the communication path, data rate, and resource condition between the nodes for executing migration based on the communication environment information acquired from the environment monitor, and drives the migration executor 117 to perform software migration through the software migration scheme determined based on such information.

For example, the migration policy manager 116 is responsible for determining the migration scheme depending according to the policy on whether to minimize the entire migration time or service suspension time based on the communication environment information.

In detail, the migration policy manager 116 may determine the execution order of transmitting a snapshot including at least one of entire memory and processor status of the source node, may transmit minimum memory and processor status capable of resuming operation of software to be migrated to the destination node, may initiate the software to be migrated to the destination node, may transmit the memory request in page fault of the destination node, may transmit memory changed in the source node during the snapshot transmission, and may suspend the operation of the software running on the source node.

According to various embodiments of the present disclosure, the migration policy manager 116 classifies the communication environment between the source and destination nodes into three conditions: a first data rate condition in which the data rate of the system bus 130 between the first node 110 and the second node 120 of the same micro-server 100 is equal to the data rate between the processor and the memory, a second data rate condition in which the data rate of the system bus 130 between the first node 110 and second node 120 is lower than that of the first data rate condition and higher than the data rate of the network 180, and the third data rate condition in which the first node 110 and the second node 210 included in the respective micro-servers 100 and 200 are connected through the network.

The second data rate condition may be the state of using the system bus such as PCIe as communication path, and the third data rate condition may be the state of using the communication link having the data rate lower than those of the first and second data rate conditions (e.g. Ethernet) as the communication path.

The migration executor 117 executes the migration of the software running on the source node to the destination node in the execution order determined by the migration policy manager 116 and manages the operations related to the migration execution.

For example, the migration executor 117 may manage the software migration according to the optimal migration execution order determined depending on the communication environment determined by the migration policy manager 116 (e.g., first data rate condition, second data rate condition, or third data rate condition).

Although the data rates between nodes are classified into first to third data rate conditions herein, various embodiments of the present disclosure are not limited thereto. For example, the communication environment-based data rate may be further classified in consideration of the communication path and designer's settings, and the nodes and communication environments related to the classified states and software migration can be called in different ways.

A description is made of the memory which may load software and data required for supporting the functions. The software includes at least one or various routines for operating functions, and the data required for operating the software function and includes the data generated in operating the application functions.

The processor state information is the information indicated by register memorizing the internal processing result of a microprocessor or processor as bit information.

The operations of the migration manager 116 and migration executor 117 for software migration from a source node to a destination node are described in detail hereinafter with reference to FIGS. 3 to 8.

Figure 3:
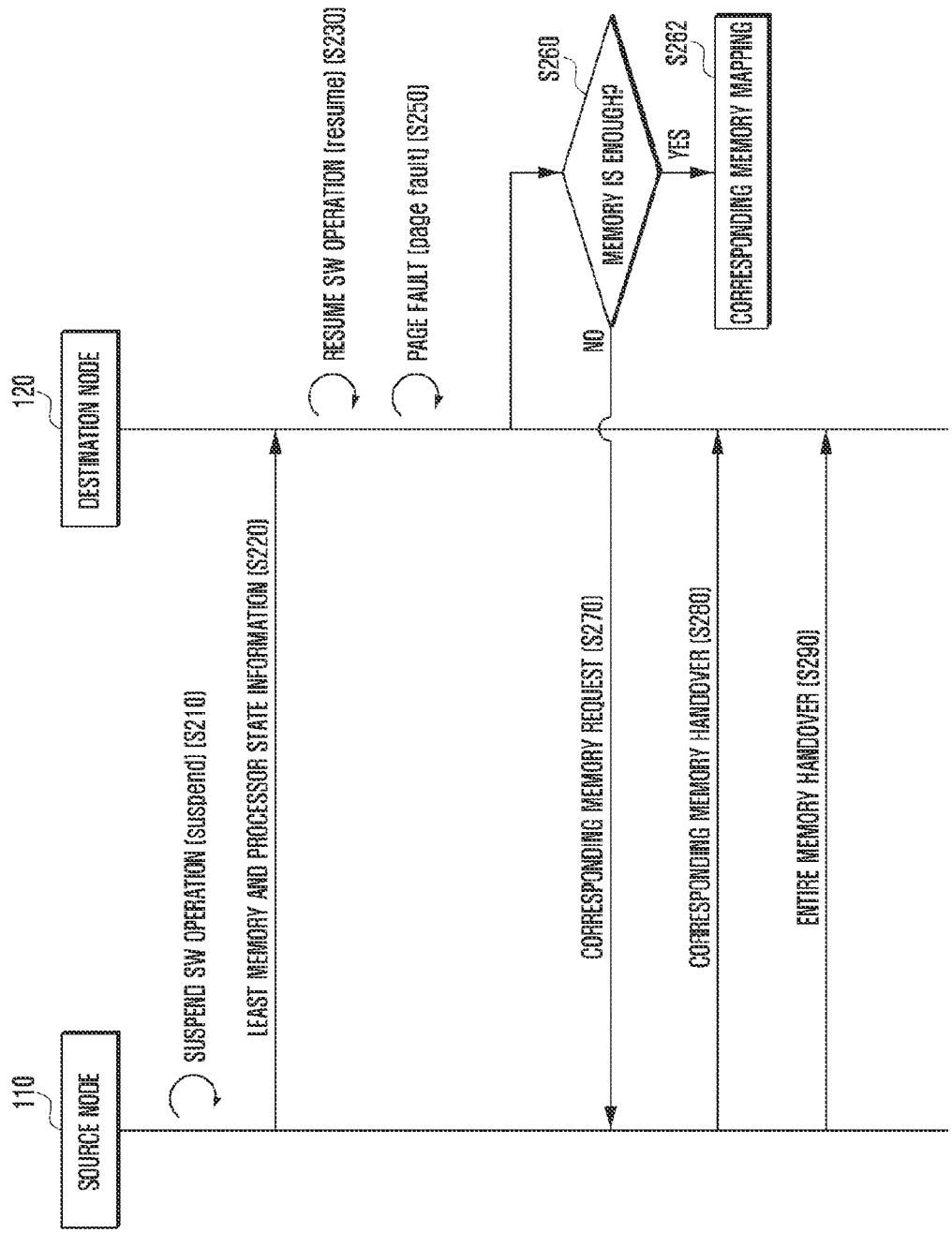
FIG. 3 is a signaling diagram illustrating signal flows between source and destination nodes for data migration at a first data rate condition in a data migration method according to an embodiment of the present disclosure.

FIG. 3 is a signaling diagram illustrating signal flows between source and destination nodes for data migration at a first data rate condition in a data migration method according to an embodiment of the present disclosure.

Figure 4:
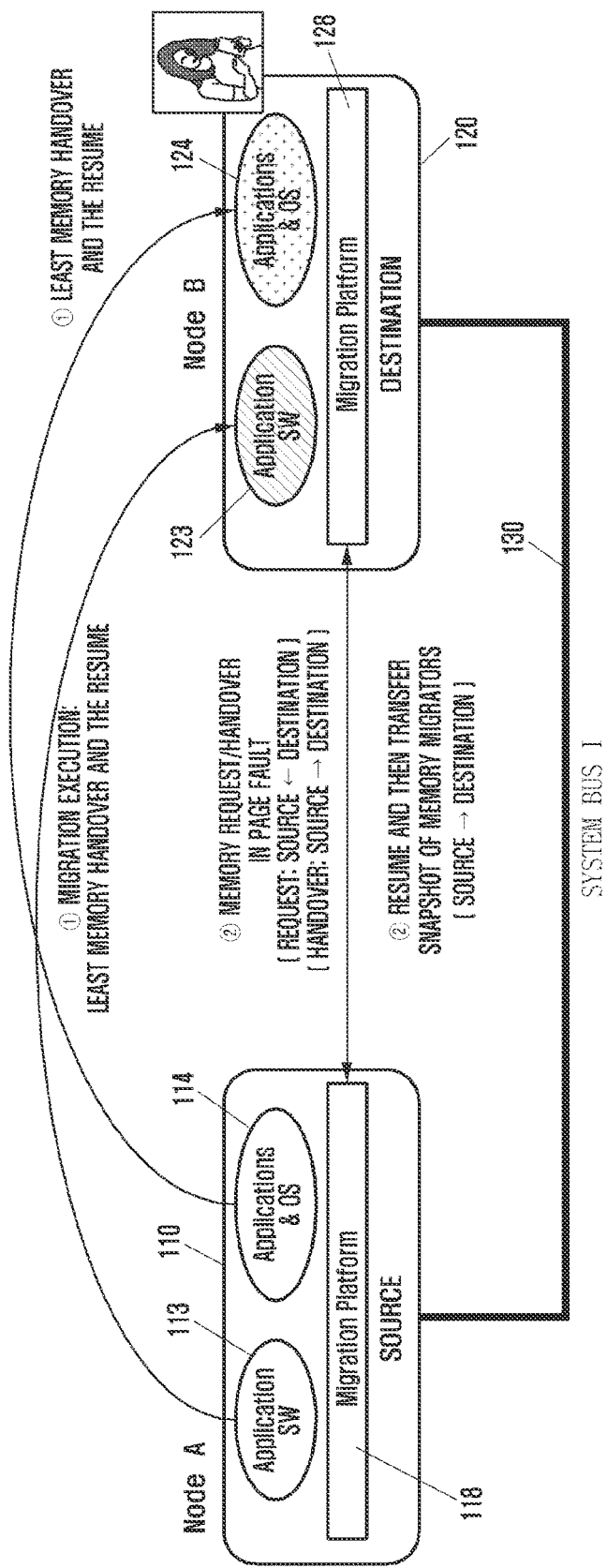
FIG. 4 is a diagram illustrating data flows between source and destination nodes for data migration such as, for example, the data flows between the source and destination nodes in the data migration procedure illustrated in FIG. 3 according to an embodiment of the present disclosure.

FIG. 4 is a diagram illustrating data flows between source and destination nodes for data migration such as, for example, the data flows between the source and destination nodes in the data migration procedure illustrated in FIG. 3 according to an embodiment of the present disclosure. A description is made of the first embodiment of the present disclosure hereinafter with reference to FIGS. 3 and 4.

Referring to FIG. 3, if the communication link between the nodes for executing software migration therebetween is determined to be established through a high speed system bus 130 is fast (e.g., close to the data rate between CPU and memory), then the migration policy manager 116 determines to apply resuming software operation with the minimum memory at operation S230 and hands over the entire memory to the destination node 120 at operation S290 simultaneously for minimizing the service-down time.

According to various embodiments of the present disclosure, the migration executor 117 may perform the software migration as follows according to the migration method determined by the migration policy manager 116.

According to various embodiments of the present disclosure, at operation S210, the migration executor 117 suspends the operation of the software 113 running on the source node 110 (e.g., the first node).

Thereafter, at operation S220, the source node 110 sends the destination node 120 information on the memory and processor state. For example, the source node 110 sends the destination node 120 the information on the minimum memory capable of resuming the operation of the software 114 and processor state.

At operation S230, the destination node 120 resumes the operation of the software 124 migrated based on the minimum memory and processor state information.

At operation S250, because although the destination node 120 resumes the operation of the software 123 the source node has not transmitted entire information on memory and processor state, page fault occurs while the software 123 operates in the destination node.

The migration policy manager 116 can be configured so as to request, when the page fault occurs, the source node 110 for memory to overcome the memory shortage as the reason for the page fault at the destination node 120.

If the page fault occurs, then at operation S260, the destination node 120 determines whether the destination node 120 has sufficient memory to resolve the memory shortage.

If the destination node 120 determines that the destination node 120 does not have sufficient memory to resolve the memory shortage at operation S260, then the destination node proceeds to operation S270 at which the destination node 120 requests the source node 110 for the corresponding memory. Thereafter, the procedure proceeds to operation S280.

In contrast, if the destination node 120 determines that the destination node 120 has sufficient memory to resolve the memory shortage at operation S260, then the destination node 120 proceeds to operation 262 at which the destination node 120 performs mapping with the local memory.

After the destination node 120 has requested for the memory at operation S270, at operation S280, the source node 110 sends the requested memory to the destination node 120.

When the page fault has occurred at the destination node 120, at operation S290, the source node 110 sends the destination node 120 a snapshot of the entire memory as well as transmitting the corresponding memory in response to the memory request from the source node 110. For example, operation S290 can be performed at the same time with operations S270 and S280.

The source node 110 transmits the snapshot of the entire memory to the destination node 120 because if only the memory corresponding to the page default occurrence is handed over, then other memory not related to the page default is not handed over. For example, if not the entire memory is handed over to the destination node, it is impossible to perform the software migration successfully.

According to the first embodiment of the present disclosure, because the snapshots of the corresponding memory and entire memory are transmitted simultaneously through the system bus fulfilling the first data rate condition as high speed link, performing the software migration efficiently without performance degradation of the source node 110 and the destination node 120 is possible.

According to the first embodiment of the present disclosure, because the source node 110 and destination node 120 may perform high speed communication, migration of the software 123 with the least service suspension time even through the steps of detecting the page default at the destination node 120 and requesting the source node 110 for the corresponding memory is possible.

In contrast to the post-copy technique according to the related art, the method according to various embodiments of the present disclosure may perform software migration efficiently with minimum service suspension time and no memory loss because the migration is performed through the system bus bridging the nodes in the micro-server environment other than network.

For example, the software migration method according to the first embodiment of the present disclosure may facilitate migration of the software and executing the migrated software at the destination node without delay of software migration because when page default occurs the memory and processor state information is copied through the system bus operating at relatively high speed.

Figure 5:
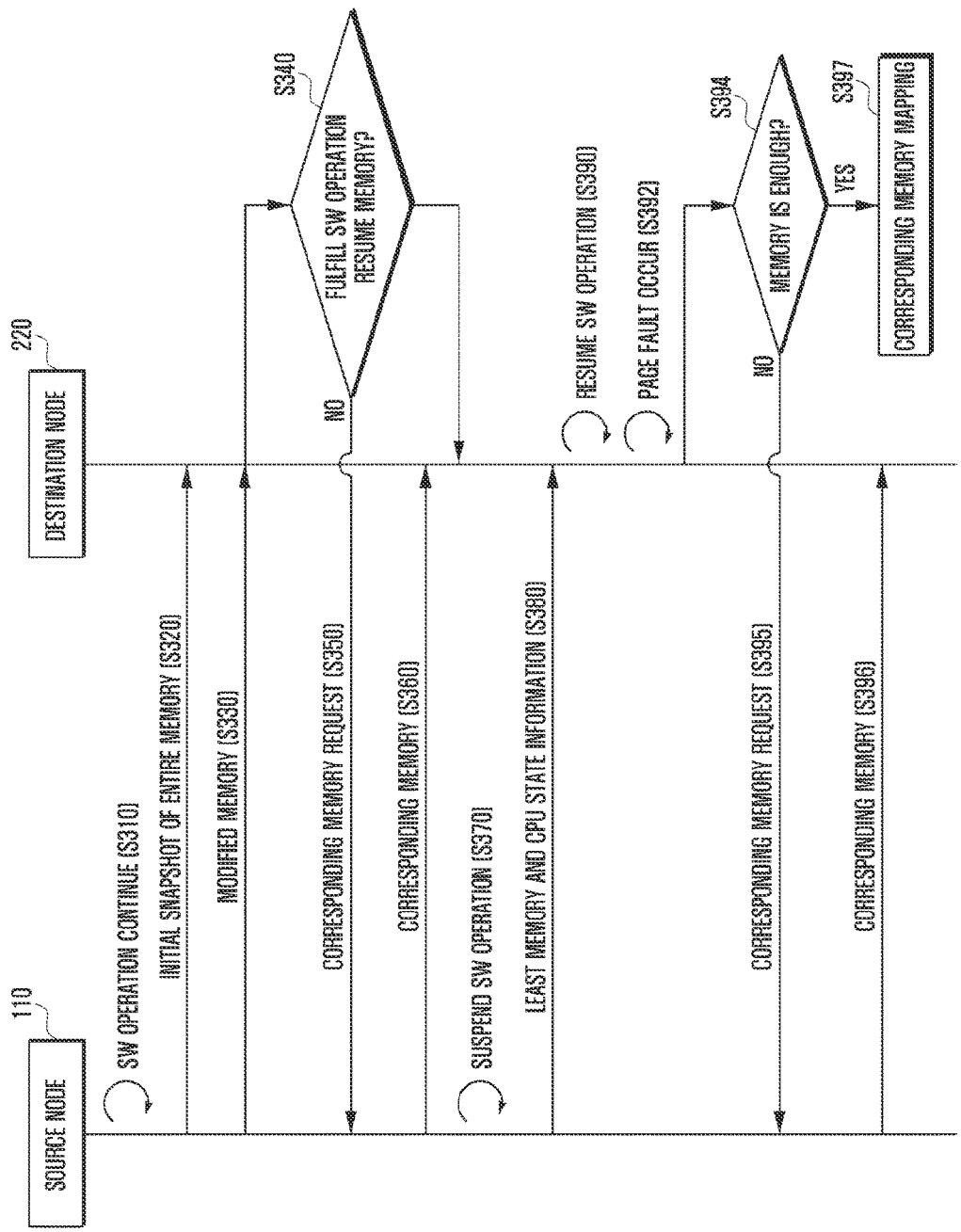
FIG. 5 is a signaling diagram illustrating signal flows between source and destination nodes for data migration at a second data rate condition in a data migration method according to an embodiment of the present disclosure.

FIG. 5 is a signaling diagram illustrating signal flows between source and destination nodes for data migration at a second data rate condition in a data migration method according to an embodiment of the present disclosure.

Figure 6:
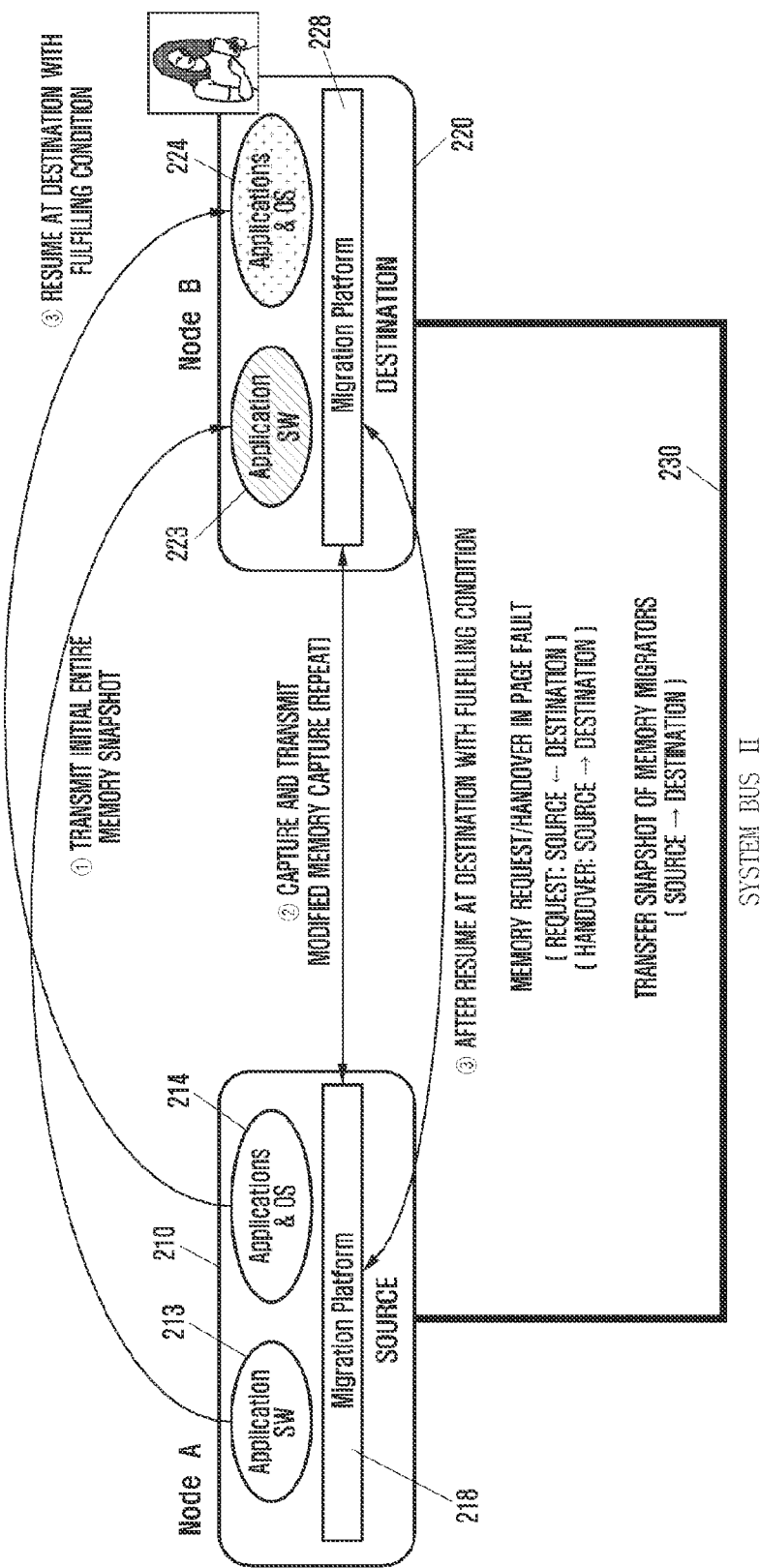
FIG. 6 is a diagram illustrating data flows between source and destination nodes for data migration such as, for example, the data flows between the source and destination nodes in the data migration procedure illustrated in FIG. 5 according to an embodiment of the present disclosure.

FIG. 6 is a diagram illustrating data flows between source and destination nodes for data migration such as, for example, the data flows between the source and destination nodes in the data migration procedure illustrated in FIG. 5 according to an embodiment of the present disclosure. A description is made of the second embodiment of the present disclosure hereinafter with reference to FIGS. 5 and 6.

Referring to FIG. 5, if the communication link between the source node 110 and destination node 220 for executing software migration therebetween is determined to be established through the system bus 130 fulfilling the second data rate condition slower than the first data rate condition and faster than the data rate of the network 180, the migration policy manager 116 determines a migration method in the course of minimizing the service suspension time.

According to the migration method determined by the migration policy manager 116, the migration executor 117 performs software migration as follows.

According to the second embodiment of the present disclosure, at operation S310, the source node 100 continues a software operation.

At operation S320, the migration executor 117 sends the destination node 220 a snapshot of the entire memory of the source node 110 at operation S320 in the state in which the software 113 is running on the source node 110. Hereinafter, the entire memory snapshot is referred to as initial snapshot.

The source node 110 may capture the modified memory snapshot while the entire memory snapshot is transferred to the destination node 220 at operation S320. Thereafter, at operation S330, the source node 110 may transmit the modified memory snapshot to the destination node 220.

For example, if the memory of the source node 110 is modified while transmitting the entire memory snapshot, the source node 110 checks (e.g., determines) the modified memory information and sends the first modified memory information to the destination node 220 after completing the entire memory snapshot transmission.

According to various embodiments of the present disclosure, the source node may check (e.g., determine) the second modification of the memory while transmitting the first modified memory snapshot to the destination node 220 and transmits the second modified memory snapshot to the destination node. This modified memory snapshot transmission process can be repeated.

Although the modified memory snapshot is transmitted repeatedly in transmitting the entire memory snapshot, performing the transmission without performance degradation of the source node 110 and the destination node 220 is possible because the system bus between the source node and the destination node 220 fulfills the second data rate condition of high speed.

At operation S340, the destination node 220 determines whether the memory of the destination node 220 is large enough to resume the software migrated at operations S320 and S330.

According to various embodiments of the present disclosure, determination as to whether the memory is large enough to resume the software can be made according to a condition predetermined by the migration policy manager 116. For example, determining whether the source node memory fulfills the condition predetermined by the migration policy manager 116 is handed over to the destination node is possible.

If the destination node 220 determines that the memory of the destination node 220 is not large enough to resume the software 124 at operation S340, then the destination node 220 may proceed to operation S350 at which the destination node 220 requests the source node 110 for the memory necessary for resuming the software 124.

Thereafter, at operation S360, the source node 110 hands over the requested memory to the destination node 220. Thereafter, at operation S370, the source node 110 suspends the operation of the currently running software. At operation S380, the source node 110 sends the information on the least memory capable of resuming the software 124 (e.g., the minimum amount of memory necessary for resuming the software 124) and the processor state to the destination node 220. Thereafter, the destination node 220 proceeds to operation S390.

If the destination node 220 determines that the memory of the destination node 220 is large enough to resume the software 124 at operation S340, then the destination node 220 may proceed to operation S390 at which the destination node 220 resumes the software 124. For example, at operation S390, the destination node 220 may resume the software 124 based on the modified memory and processor state information transmitted by the source node 110.

After the resume of the software at the destination node 220 at operation S390, the source node 110 may hand over the remaining memory to the destination node 220.

At operation S392, the destination node 220 detects the page fault.

At operation S394, the destination node 220 determines whether sufficient memory exists to resolve the page fault in the destination node 220.

If the destination node 220 determines that sufficient memory exists to resolve the page fault at operation S394, then, at operation S395, the destination node 220 requests the source node 110 for the corresponding memory.

At operation S396, the source node 110 hands over the requested memory to the destination node 220. If the memory handover has completed, the page default is resolved, resulting in completion of software migration.

Otherwise if the destination node 220 determines that sufficient memory exists to resolve the page fault at operation 394, then the destination node proceeds to operation S397 at which the destination node 220 performs mapping with the location memory.

The page fault occurrence probability at operation S392 of the second embodiment of the present disclosure is very low as compared to that in the first embodiment of the present disclosure.

As an example, the page fault occurrence probability at operation S392 of the second embodiment of the present disclosure is very low as compared to that in the first embodiment of the present disclosure because the source node monitors and reports the change of the memory at operation S330 even when transmitting the initial memory snapshot at operation S320 and hands over the memory requested by the destination node 220 at operation S360 for preparing for page fault and notifies of the change of memory since the initial memory snapshot at operation S320 at operation S370.

The software migration method according to the second embodiment of the present disclosure copies the entire memory of the source node and the modified memory frequently enough after initiation of software migration and while executing the software at the source node and thus decreases the page fault occurrence probability in executing the software at the destination node, and the software migration through system bus faster than network reduces the entire software migration time.

Figure 7:
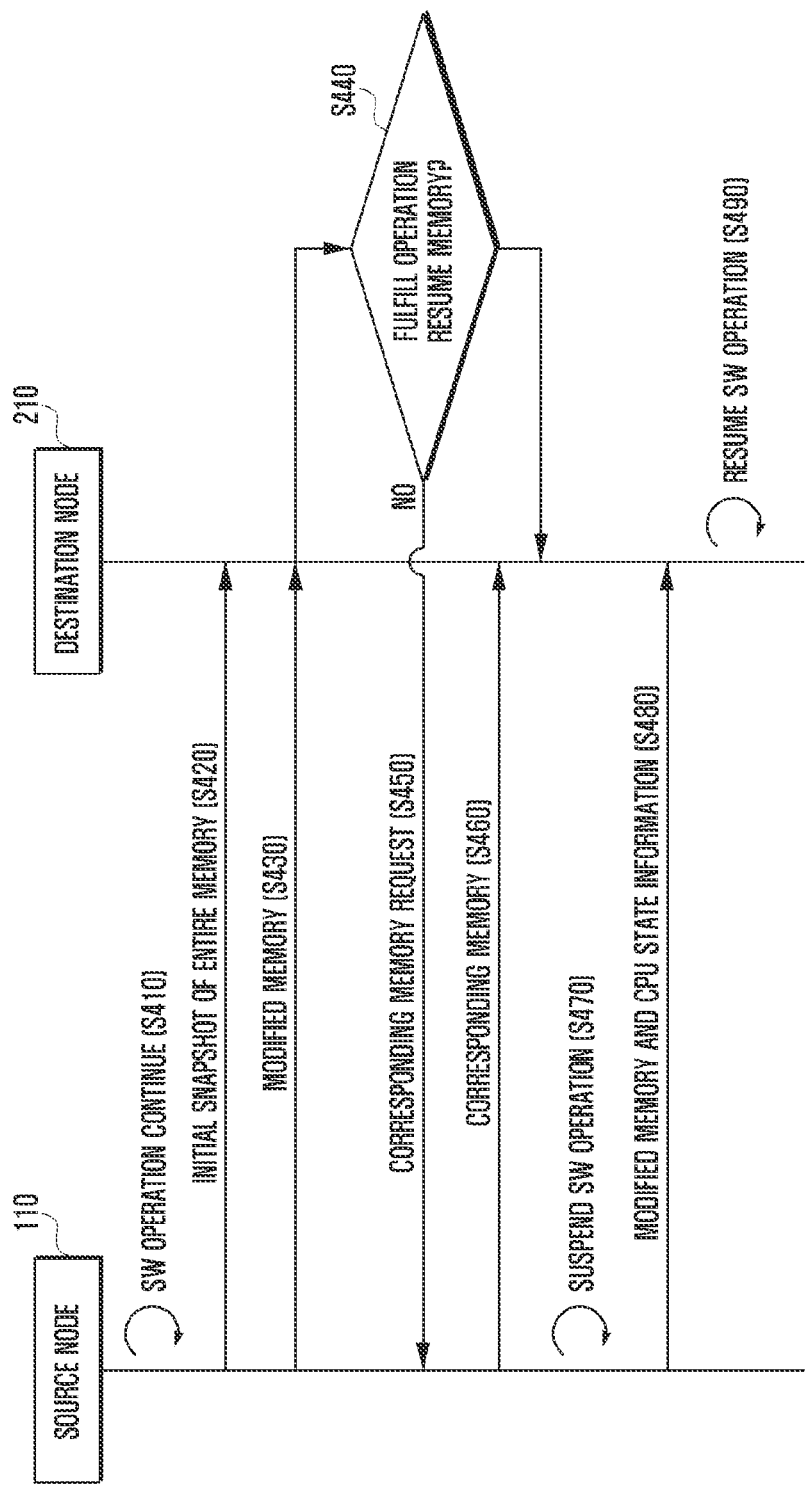
FIG. 7 is a signaling diagram illustrating signal flows between source and destination nodes for data migration at a third data rate condition in a data migration method according to an embodiment of the present disclosure.

FIG. 7 is a signaling diagram illustrating signal flows between source and destination nodes for data migration at a third data rate condition in a data migration method according to an embodiment of the present disclosure.

Figure 8:
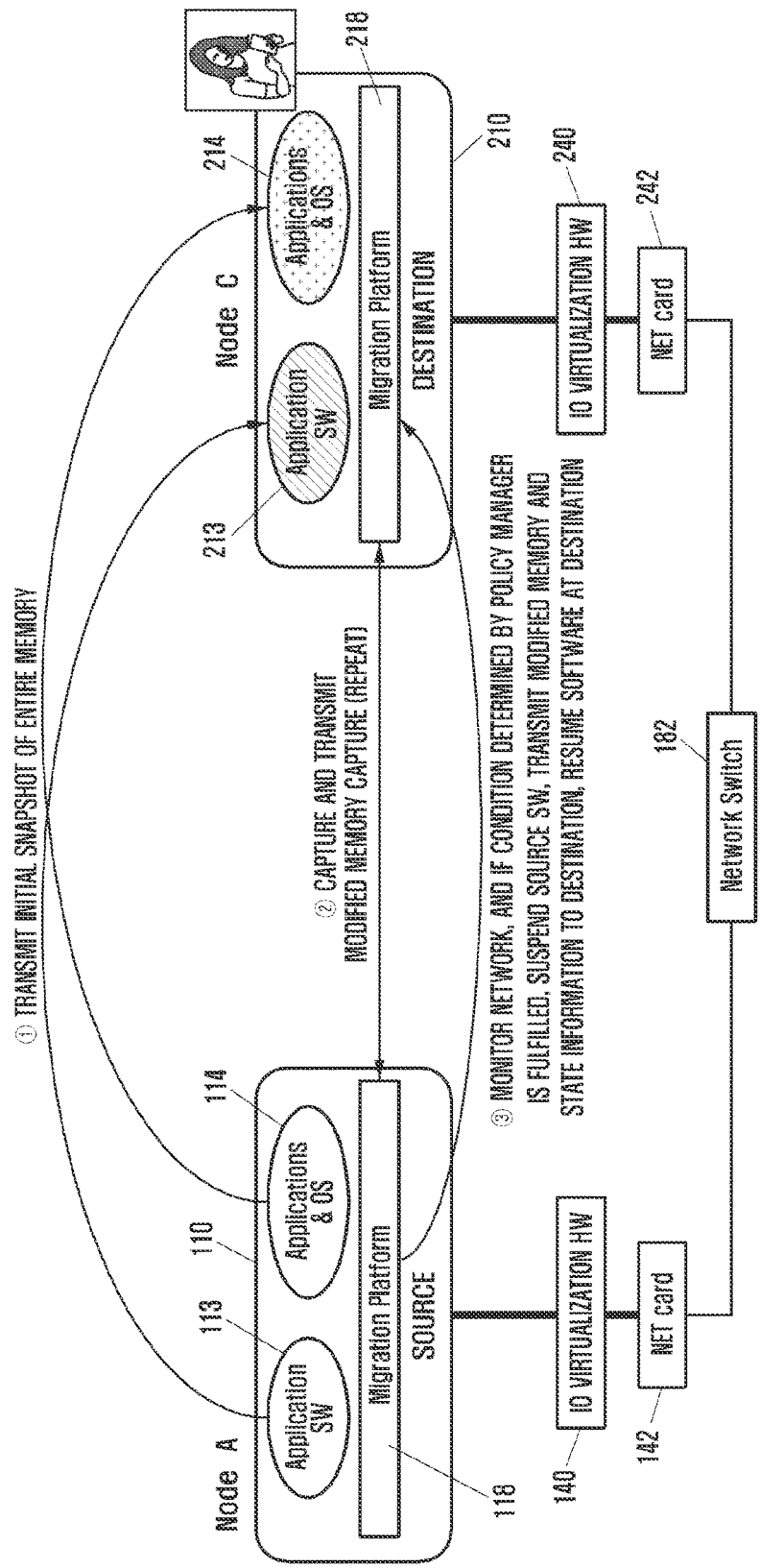
FIG. 8 is a diagram illustrating data flows between source and destination nodes for data migration such as, for example, the data flows between the source and destination nodes in the data migration procedure illustrated in FIG. 7 according to an embodiment of the present disclosure.

FIG. 8 is a diagram illustrating data flows between source and destination nodes for data migration such as, for example, the data flows between the source and destination nodes in the data migration procedure illustrated in FIG. 7 according to an embodiment of the present disclosure.

A description is made of the third embodiment of the present disclosure hereinafter with reference to FIGS. 7 and 8.

Referring to FIG. 7, if the communication link between the source and destination nodes for executing software migration therebetween is determined to be established through a normal network link such as Ethernet fulfilling the third data rate condition slower than the communication links of the first and second data rate conditions, the migration policy manager 116 determines a migration method compromising depending on the network speed.

In the following, the description is made under the assumption that the source node 110 and the destination node 210 are included in different micro-servers 100 and 200 and connected through a normal network 180.

The migration policy manager 116 may determine the method of migrating the software 113 operating on the source node 110 to the destination node depending on the analysis result about the network condition between the source node 110 and destination node 210. According to the software migration method determined by the migration policy manager 116, the migration executor 117 performs the software migration as follows.

According to the third embodiment of the present disclosure, at operation S410, the source node 110 continues the software operation.

At operation S420, the migration executor 117 sends the destination node 210 the initial snapshot of the entire memory of the source node 110 at operation S429 in the state that the software 1130 is running.

At operation S430, the source node 110 may send the destination node 210 a snapshot of the memory modified while transmitting the entire memory snapshot at operation S420. The modified memory snapshot transmission may occur whenever the memory is modified while the entire memory snapshot is being transmitted.

For example, the source node 110 may check (e.g., determine) the first memory modification while the entire memory snapshot is being transmitted and transmitting the first memory modification information to the destination node 210 after the completion of the entire memory snapshot transmission. According to various embodiments of the present disclosure, the source node 110 may check (e.g., determine) the second memory modification while the first memory modification information is being transmitted and may transmit the second memory modification information to the destination node after the completion of the first memory modification information transmission. As aforementioned, the memory snapshot transmission may be repeated.

At operation S440, the destination node 210 determines whether the software 213 resume condition is fulfilled (e.g., through operations S420 and S430).

The software resume condition can be predetermined by the migration policy manager 116. For example, the source node 110 determines whether the source node memory fulfilling the condition predetermined by the migration policy manager 116 is handed over to the destination node 210.

If the destination node 210 determines that the software resume condition is not fulfilled at operation S440, then the destination node 210 may proceed to operation S450 at which the destination node 210 requests the source node 110 for the memory necessary for resuming the software 213.

In response to the request, at operation S460, the source node 110 hands over the requested memory to the destination node 210. Thereafter, the data migration method proceeds to operation S470.

In contrast, if the destination node 210 determines that the software resume condition is fulfilled at operation S440, then, at operation S470, the source node 110 stops the operation of the software 113. For example, the source node 110 may suspend the operation of the software 113.

At operation S480, the source node 110 sends the destination node 210 the information on the modified memory and processor state.

At operation S490, the destination node 210 resumes the software 213 based on the memory and processor state information transmitted from the source node 110 at the previous operations S420, S460, and S480.

According to the third embodiment of the present disclosure, because the residual memory required for the software migrated to the destination node 210 is handed over to the destination node 210 after stopping the software at the source node 110 at the last operation, the destination node 210 has the memory necessary for resuming the software and thus the page fault probability is very low.

In summary, the data migration method according to the third embodiment of the present disclosure is performed in such a way of transmitting the entire memory snapshot initially and modified memory snapshots during the entire memory snapshot transmission from the source node to the destination node, determining, at the destination node, whether the software resume condition is fulfilled, stopping the software at the source node if the destination node determines that the software resume condition is fulfilled, and transmitting modified memory and processor state information from the source node to the destination node, thereby improving software execution speed while avoiding performance degradation of the source and destination nodes in consideration of the network condition.

According to various embodiments of the present disclosure, the methods corresponding to the data rate condition can be modified depending on the designer's settings or communication environment of the micro-server.

According to various embodiments of the present disclosure, the micro-servers may include various types of devices providing a menu page and the default pages of the same level. For example, the server 100 can be any of mobile communication terminals operating based on the communication protocols of corresponding communication systems and various information communication and multimedia devices including Portable Multimedia Player (PMP), digital broadcast player, Personal Digital Assistant (PDA), music player (e.g. MP3 player), portable game console, smartphone, laptop and hand-held PC, a mobile medical device, a camera, an e-book reader, and equivalents thereof.

According to various embodiments of the present disclosure, the software migration method and apparatus in the micro-server environment may reduce power consumption of the micro-server and manage nodes efficiently, optimize load balancing among the nodes, resulting in maximization of the resource utilization of micro-server.

According to various embodiments of the present disclosure, the software migration method and apparatus in the micro-server environment may migrate software without service suspension and improving lower power capability.

According to various embodiments of the present disclosure, the software migration method and apparatus in the micro-server environment may reduce the service-down time using the high speed system bus between the nodes of the micro-server for software migration.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A software migration apparatus for use in a micro-server environment, the apparatus comprising:
    an environment monitor executed by a processor which monitors communication environment between a source node and a destination node constituting a micro-server;
    a migration policy manager executed by a processor which analyzes communication environment information acquired from the environment monitor and determines a migration scheme for migrating a software running at the source node to the destination node based on the analysis of the communication environment between the source node and the destination node; and
    a migration executor executed by a processor which executes migration of the software operating at the source node to the destination node according to the migration scheme determined by the migration policy manager,
    wherein the migration executor is configured to: transmit, when the migration policy manager determines the communication environment between the source and destination nodes as a second communication environment of a high speed system bus which corresponds to data rate slower than the data rate of a first communication environment and faster than a data rate of an Ethernet environment,
    an initial snapshot of entire memory of the source node to the destination node, transmit information on a memory of the source node which is modified in transmitting the initial snapshot,
    suspend, when the memory handed over from the source node to the destination node according to the initial snapshot and modified memory information transmission fulfills a predetermined condition,
    the software operating at the source node, transmit information on a minimum memory and processor state necessary for resuming the software to the destination node,
    and resume the software migrated to the destination node, and wherein the data rate of the first communication environment corresponds to a data rate between a processor and a memory.

2. The apparatus of claim 1, wherein the environment monitor analyzes at least one system bus connecting the source node and destination node to each other and the communication environment.

3. The apparatus of claim 1, wherein the migration policy manager determines an order and timing of handing over memory between the source node and the destination node in consideration of the communication environment between the source and destination nodes, resumes the software at the destination node, and suspends the software at the source node.

4. The apparatus of claim 1, wherein the migration policy manager determines an order of at least one of transmitting a snapshot including at least one of entire memory and processor state of the source node, transmitting a minimum memory and processor state necessary for resuming the software at the destination node, resuming the software at the destination node, handing over memory requested in detection of page default at the destination node, transmitting modified memory information of the source node in transmitting the snapshot, and suspending operation of the software at the source node, in consideration of data rate between the source and destination nodes.

5. The apparatus of claim 1, wherein the migration policy manager is further configured to: suspend, when the migration policy manager determines the communication environment between the source and destination nodes as a first communication environment, migration of the software operating at the source node, transmit information on a minimum memory and processor state capable necessary for resuming operation of the software from the source node to the destination node, resume the software at the destination based on the information on the minimum memory and processor state transmitted by the source node, hand over memory requested in occurrence of page fault at the destination node from the source node to the destination node, and transmit entire memory snapshot and software from the source node to the destination node along with the handover of the memory requested in occurrence of the page fault.

6. The apparatus of claim 1, wherein the source node records information on the memory modified at the source node in transmitting the initial snapshot, and transmits the modified memory information to the destination node after completion of the initial snapshot transmission.

7. The apparatus of claim 6, wherein the source node records information on the memory modified at the source node in transmitting a first modified memory information, and transmits second modified memory information to the destination after completion of the first modified memory information transmission, and wherein transmission of the modified memory information is repeated.

8. The apparatus of claim 1, wherein the condition is predetermined by the migration policy server and is used for determining whether resuming the software at the destination node is possible.

9. The apparatus of claim 1, wherein the migration executor requests, after resuming the software at the destination node, the source node for memory necessary for resolving the page fault occurred when resuming the software at the destination node, and hands over the requested memory from the source node to the destination node.

10. The apparatus of claim 9, wherein the migration executor requests the source node for the memory necessary for resolving the page fault, and hands over the requested memory from the source node to the destination node along with the initial snapshot transmission.

11. The apparatus of claim 9, wherein the migration executor transmits, when the migration policy manager determines the communication environment between the source and destination nodes as a third communication environment of normal network connection which corresponds to data rate slower than the data rates of the first and second communication environments, the initial snapshot of the entire memory of the source node in the state that the software is operating at the source node, transmits the information on memory of the source node which is modified in transmitting the initial snapshot, determines whether the a condition for resuming the software at the destination node is fulfilled through the initial snapshot transmission and modified memory information transmission, suspends, when the condition is fulfilled, the software at the source node, transmits the information on the modified memory and processor state information to the destination node, and resumes the software at the destination node.

12. The apparatus of claim 11, wherein the condition is predetermined by the migration policy server and is used for determining whether resuming the software at the destination node is possible.

13. The apparatus of claim 11, wherein the source node records information on the memory modified at the source node in transmitting the initial snapshot and transmits the modified memory information to the destination node after completion of the initial snapshot transmission.

14. The apparatus of claim 13, wherein the source node records information on the memory modified at the source node in transmitting a first modified memory information, and transmits second modified memory information to the destination after completion of the first modified memory information transmission, wherein transmission of the modified memory information is repeated.

15. A software migration method for use in a micro-server environment, the method comprising: analyzing communication environment between a source node and a destination node constituting a micro-server; and determining a migration scheme for migrating a software running at the source node to the destination node based on the analysis of the communication environment between the source node and the destination node, wherein the determining of the migration scheme comprises:
transmitting, when the migration policy manager determines the communication environment between the source and destination nodes as a second communication environment of a high speed system bus which corresponds to a data rate slower than the data rate of a first communication environment and faster than a data rate of an Ethernet environment,
an initial snapshot of an entire memory of the source node to the destination node, transmitting information on the memory of the source node which is modified in transmitting the initial snapshot,
suspending, when the memory handed over from the source node to the destination node according to the initial snapshot and modified memory information transmission fulfills a predetermined condition, the software operating at the source node,
transmitting information on a minimum memory and processor state necessary for resuming the software to the destination node,
and resuming the software migrated to the destination node, and wherein the data rate of the first communication environment corresponds to data rate between a processor and a memory.

16. The method of claim 15, wherein the determining of the migration scheme further comprises: determining an order and timing of handing over memory between the source node and the destination node in consideration of the communication environment between the source and destination nodes, resuming the software at the destination node, and suspending the software at the source node.

17. The method of claim 15, wherein the determining of the migration scheme further comprises: determining an order of at least one of transmitting a snapshot including at least one of entire memory and processor state of the source node, transmitting a minimum memory and processor state necessary for resuming the software at the destination node, resuming the software at the destination node, handing over memory requested in detection of page default at the destination node, transmitting modified memory information of the source node in transmitting the snapshot, and suspending operation of the software at the source node, in consideration of data rate between the source and destination nodes.

18. The method of claim 15, wherein the determining of the migration scheme further comprises: suspending, when the migration policy manager determines the communication environment between the source and destination nodes as a first communication environment, operation of the software operating at the source node and transmitting information on a minimum memory and processor state necessary for resuming operation of the software from the source node to the destination node; resuming the software at the destination based on the information on the minimum memory and processor state transmitted by the source node; handing over memory requested in occurrence of page fault at the destination node from the source node to the destination node; and transmitting entire memory snapshot of the source node to the destination node as the same time of the handover of the memory requested in occurrence of the page fault.

19. The method of claim 15, wherein the transmitting of the information on the memory of the source node which is modified in transmitting the initial snapshot further comprises: recording information on the memory modified at the source node in transmitting the initial snapshot, and transmitting the modified memory information to the destination node after completion of the initial snapshot transmission.

20. The method of claim 19, wherein the transmitting of the information on the memory of the source code which is modified in transmitting the initial snapshot comprises: recording information on the memory modified at the source node in transmitting a first modified memory information, and transmitting second modified memory information to the destination after completion of the first modified memory information transmission, and wherein transmission of the modified memory information is repeated.

21. The method of claim 15, wherein the condition is used for determining whether resuming the software at the destination node is possible.

22. The method of claim 15, further comprising: requesting, after resuming the software at the destination node, the source node for memory necessary for resolving the page fault occurred when resuming the software at the destination node; and handing over the requested memory from the source node to the destination node.

23. The method of claim 22, wherein the requesting of the source node for the memory necessary for resolving the page fault and the handing over of the requested memory from the source node to the destination node are performed along with the initial snapshot transmission.

24. The method of claim 15, wherein the determining of the migration scheme further comprises:
transmitting, when the migration policy manager determines the communication environment between the source and destination nodes as a third communication environment of normal network connection which corresponds to data rate slower than the data rates of the first and second communication environments, the initial snapshot of the entire memory of the source node in the state that the software is operating at the source node;
transmitting the information on memory of the source node which is modified in transmitting the initial snapshot; determining whether the a condition for resuming the software at the destination node is fulfilled through the initial snapshot transmission and the modified memory information transmission; suspending, when the condition is fulfilled, the software at the source node and transmitting the information on the modified memory and processor state information to the destination node; and resuming the software at the destination node.

25. The method of claim 24, wherein the transmitting of the information on the memory of the source node which is modified in transmitting the initial snapshot comprises recording information on the memory modified at the source node in transmitting the initial snapshot, and transmitting the modified memory information to the destination node after completion of the initial snapshot transmission.

26. The method of claim 25,
wherein transmitting of the information on the memory of the source node which is modified in transmitting the initial snapshot further comprises recording information on the memory modified at the source node in transmitting a first modified memory information, and transmitting second modified memory information to the destination after completion of the first modified memory information transmission, wherein transmission of the modified memory information is repeated.

27. The method of claim 24, wherein the condition is used for determining whether resuming the software at the destination node is possible.

28. A non-transitory computer-readable storage medium storing instructions that, when executed, cause at least one processor to perform the method of claim 15.

* * * * *